United States Patent [19]
Warner et al.

[11] Patent Number: 5,224,732
[45] Date of Patent: Jul. 6, 1993

[54] INFLATABLE RESTRAINT SYSTEM FOR SIDE IMPACT CRASH PROTECTION

[76] Inventors: Charles Y. Warner, 486 W. Chokecherry, Orem, Utah 84058; John J. Gordon, 1301 E. 640 South, Provo, Utah 84606; Ralph C. Warner, 1386 E. Marinda Way, Salt Lake City, Utah 84121; Mark H. Warner, 1386 Springdell Dr., Provo, Utah 84604; Karl H. Wenger, 868 E. Romano Ave., Salt Lake City, Utah 84105

[21] Appl. No.: 731,004

[22] Filed: Jul. 16, 1991

[51] Int. Cl.$^5$ ............................................. B60R 21/22
[52] U.S. Cl. ................................. 280/730; 280/743
[58] Field of Search .............. 280/728, 730, 731, 732, 280/743

[56] References Cited

U.S. PATENT DOCUMENTS

| | | | |
|---|---|---|---|
| 3,787,075 | 1/1974 | Francis | 280/731 |
| 3,819,204 | 6/1974 | Oka et al. | 280/732 |
| 4,235,435 | 11/1980 | Lawson et al. | 280/743 |
| 4,286,954 | 9/1981 | McArthur et al. | 280/743 |
| 4,770,439 | 9/1988 | Maier et al. | 280/732 |
| 4,772,045 | 9/1988 | Kawaguchi et al. | 280/728 |
| 4,842,300 | 6/1989 | Ziomek | 280/743 |
| 4,966,388 | 10/1990 | Warner | 280/730 |

FOREIGN PATENT DOCUMENTS

| | | | |
|---|---|---|---|
| 772119 | 1/1972 | Belgium | 280/743 |
| 2-155855 | 6/1990 | Japan | 280/728 |
| 2-249740 | 10/1990 | Japan | 280/728 |
| 2220620 | 1/1990 | United Kingdom | 280/730 |

Primary Examiner—Karin L. Tyson

[57] ABSTRACT

An inflatable protective system provides cushioning and containment for the head, thorax, and pelvis of an occupant of a vehicle during side impact of the vehicle by another object. The system includes an inflatable bag that is attached to a mounting plate, which extends over the lower section of a side panel assembly of the vehicle. The inflatable bag includes an upper portion foldable into a stowed position facing the occupant's thorax when seated on the seat. A deployment envelope including at least one sheet of bearing material and at least one sheet of friction reducing material is sandwiched between the bag and a cushioning panel, which is detachably connected to an inner side of the side panel assembly, to enhance the smooth deployment of the bag. An inflator responsive to an impact against the side panel assembly inflates the lower portion of the bag, which expands laterally toward the thorax and pelvis of the occupant to form a shock absorbent cushion and barrier for restraining the occupant's thorax and pelvis from moving into the side panel assembly. The entire cushioning panel is propelled across the lateral spacing between the side panel assembly and the seat toward the occupant to make initial cushioned contact with the seat and the occupant and to initiate lateral movement of the occupant away from the side panel assembly. The lateral expansion of the lower portion of the bag opens accordion-like pleats folded in the upper portion of the bag and permits the upper and lower bag portions to simultaneously reach their fully inflated positions.

17 Claims, 15 Drawing Sheets

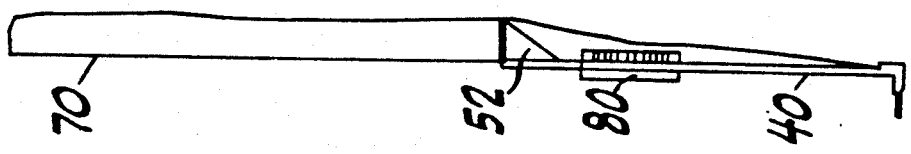
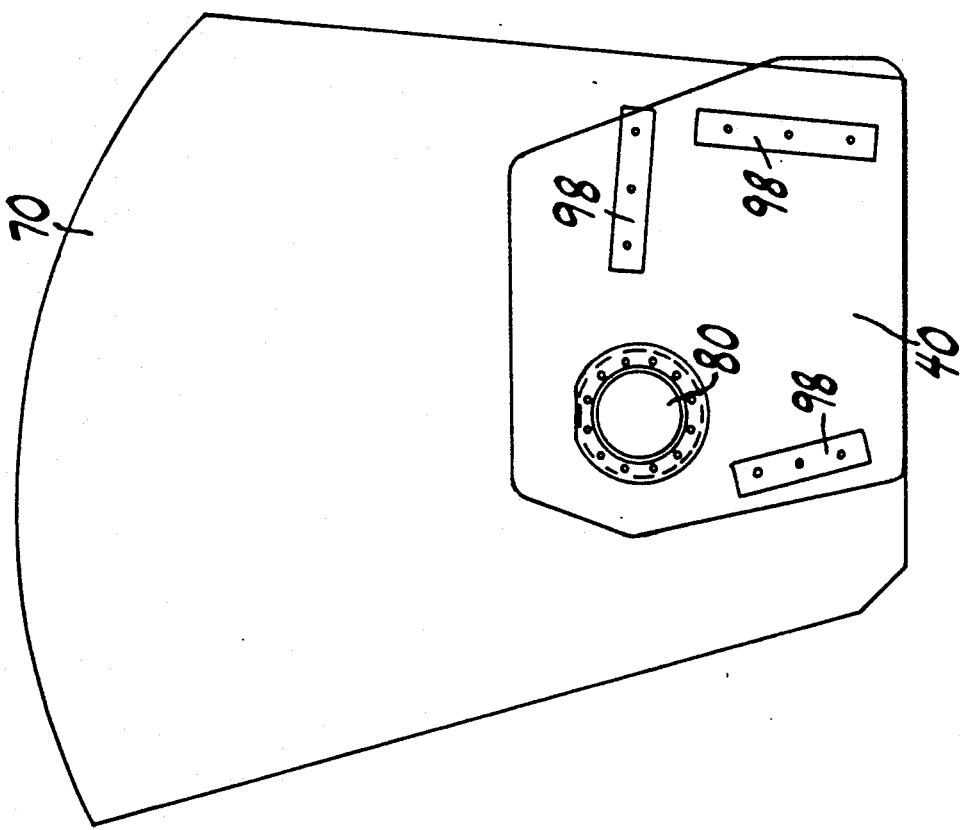

INFLATABLE RESTRAINT SYSTEM FOR SIDE IMPACT CRASH PROTECTION

BACKGROUND OF THE INVENTION

The invention relates generally to inflatable restraint systems for protecting an occupant of an automotive vehicle and the like from side impacts and, more particularly, to an improved inflatable restraint system that protects the head, thorax, and pelvis of an occupant from side impacts by restraining the movement of the occupant and cushioning contact between the occupant and structural members of the vehicle body during a collision.

An inflatable restraint system for protecting the head and torso regions of an occupant of an automotive vehicle from injury during side impacts is disclosed in U.S. Pat. No. 4,966,388 (hereinafter "the '388 patent"). The disclosure of this patent was developed by the assignee of the present invention and is incorporated by reference herein. In this patent, an air bas assembly mounted in a side door of a vehicle is designed to be fully deployed in about 30 to 50 milliseconds after a side impact of the vehicle is sensed. The air bag inflates from a stored position in a cavity in the side door to a deployed position forming a barrier for preventing injury to the occupant's head, neck, and shoulders.

In further developing such an inflatable restraint system, the assignee of the present invention identified several aspects of the prior system which could be improved. First of all was a recognition of the need to provide protection for the pelvic regions of the occupant and to better control the deployment of the bag to direct it toward the occupant.

As evident from FIG. 3 of the '388 patent, the fully deployed air bag only covers the head and shoulder regions of the occupant. Although inflation of the air bag propels a hinged door portion of a cushioning panel toward the occupant's torso, it is clear from FIG. 3 that only the top of the cushioning panel is propelled toward the occupant. Furthermore, the air bag itself does not afford any protection in the pelvic region.

Another area where there is always room for improvement in systems of this type is in the deployment of the air bag from its stowed position to its fully inflated position. As the lateral distance between the occupant and the side of the vehicle is generally small, the air bag must be deployed as quickly as possible, especially to allow the bag to expand upwardly to protect the head of the occupant. Thus, in the '388 patent it was noted that the timing of the deployment of the air bag is absolutely critical. For example, in a 28 mile per hour side impact, each millisecond delay represents about one-half inch of side panel or door penetration. Thus, the invention also is directed to enhancing deployment of the bag to ensure it is inflated quickly enough to provide adequate protection for the head, thoracic, and pelvic regions of the occupant.

In the prior restraint system, the stowed air bag directly contacts the inner surface of the foamed cushioning panel. (See, for example, FIGS. 1 and 3 of the '388 patent). The contact between the outer surface of the air bag, typically nylon material, and the foamed cushioning panel, typically polyethylene, produces frictional forces, which hinder rapid deployment of the air bag. This friction can retard the inflation of the air bag by restraining the immediate deployment of the bag.

The folding technique employed to store an air bag in its stowed position also affects its deployment. As illustrated in FIGS. 8-12 of the '388 patent, the prior folding technique involved folding protruding fore and aft sections of the bag inwardly so as to lie over or be nested inside the central, generally rectangular portion of the bag. The upper one-third portion of the rectangular configuration was then folded about the bottom edge of the central portion to overlie the front of the lower one-third portion of the bag. A final S-shaped fold in the free upper edge of the upper portion could then be made.

The resulting pouch was then inserted into a cavity in the side panel such that the upper portion of the bag faced the interior of the vehicle. As specifically noted in column 6, lines 23-30, of the '388 patent, this folding technique required the bag to expand laterally toward the interior of the vehicle before inflation in the vertical direction occurred. As a result, the bag tended to rotate around the upper folding line of the bag and the lower section of the bag would have to be almost completely inflated before the upper half of the bag would inflate. This resulted in the possibility of the bag not expanding upwardly quickly enough to protect the occupant's head.

Finally, the air bag of the '388 patent employed internal tethers to control the shape of the bag in its deployed condition and add to its strength. As illustrated in FIGS. 6, 7, 13, and 14 of the '388 patent, each tether was stitched between opposed sides of the bag in a position with its longitudinal dimension arranged along a radial line emanating from the inflator. As the thrust of the gas generated by the inflator emanates spherically therefrom, the stress on the tethers caused by the deployment of the air bag is greatest at the end of the tether closest to the inflator. Thus, depending upon the particular geometry of the bag, pressure of the inflator gas, etc., such a radial tether arrangement could lead to the tearing of the tethers or of the bag itself along the radial stitching where the tethers are attached.

SUMMARY OF THE INVENTION

The invention protects the pelvis of the occupant by providing a cushioning panel that is propelled in its entirety towards the occupant and by controlling the inflation of the air bag to ensure that it moves towards the waist area of the occupant. The inflation of the bag is controlled by providing a mounting plate for the inflatable bag that extends downwardly much further towards the bottom of the door panel than the backup plate of the '388 patent. The lower section of the bag is attached to the mounting plate at several locations to ensure that the bag expands laterally inwardly to protect the pelvic and waist regions of the passenger.

To better control the deployment of the bag and direct it toward the occupant, the mounting plate of the invention may include an inclined guide pad installed on an upper portion thereof above the inflator opening. As the inflatable bag expands laterally inwardly and upwardly, the bag is guided by the inclined pad inwardly away from the window of the side door to prevent the bag from being ejected through the window instead of moving toward the occupant.

The invention markedly enhances the smooth deployment of the air bag over the prior system to reduce the risk that the bag will not fully inflate rapidly enough to protect the head, thorax, and pelvis of the occupant.

The enhancement in deployment is achieved primarily by two improvements.

The first improvement concerned the addition of a deployment envelope, which includes at least one sheet of bearing material for restraining forward deployment of the bag, and at least one sheet of friction reducing material. The deployment envelope is inserted between the outer surface of the air bag and the polymeric cushioning panel to aid in the smooth deployment of the bag. The bearing sheet may comprise a sheet of material having a first nylon surface, which abuts against the cushioning panel, and a second rubberized surface, which abuts against the rubberized side of a second similarly formed sheet of material, i.e., a sheet having a nylon surface and a rubberized surface. Thus, the two bearing sheets are placed with their rubber side facing inwardly toward each other and their nylon sides facing outwardly. The innermost sheet of bearing material may be connected to the bottom of the mounting plate. The bearing sheets may be formed from the same material from which the air bag itself is made. Sandwiched between the nylon surface of the outer bearing sheet is at least one and preferably two sheets of reduced friction material, such as butcher paper, which may be covered with talc or similar powder to further reduce friction. The bearing sheets act as restraining surface against which the bag presses during forward deployment, while the two sheets of paper facilitate smooth, tangle-free deployment of the bag.

The second improvement in the deployment of the air bag concerns the folding technique employed to store the bag in its stowed position in the side panel. The invention reduces the risk of improper or incomplete inflation by providing a folding technique in which the bag is designed to be totally inflated in both lateral and upward directions within a very short time. First, a bottom portion of the bag is attached to the mounting plate such that when the mounting plate is fixed to the side panel assembly, the bottom of the bag lies opposite the pelvis of an occupant seated on the vehicle seat. Then, the side edges of the bag are folded horizontally inwardly with respect to the final position of the mounting plate, i.e., in a first direction generally parallel to the top and bottom edges of the mounting plate, to form side folds generally confined, in at least the first direction, within the envelope of the mounting plate. Next, the top portion of the bag is folded vertically downwardly in a second direction generally perpendicular to the first direction to form accordion-like pleats. The pleats also are generally confined, in at least the second direction, within the envelope of the mounting plate and extend downwardly over only a portion of the mounting plate. Final folds in the first direction may then arrange any peripheral areas of the bag within the envelope of the mounting plate. Deployment of the bag is enhanced by this folding technique as the bag first expands laterally inwardly to open the accordion-like pleats, thereby presenting a greater area into which the gas can expand and fully inflate the upper and lateral portions of the bag approximately simultaneously.

In addition to enhancing deployment of the bag, the improved folding technique of the invention aids in protecting the pelvis of the occupant by ensuring that the bag moves laterally toward the waist area of the occupant. Furthermore, the folding technique prevents the bag from being propelled through the window of the side panel assembly instead of toward the occupant, which was a possibility when the folding technique of the '388 patent was employed, particularly when the restraint system was used with a laterally inwardly curving door frame.

The present invention also improves upon the strength of the air bag and avoids the tendency of the bags to tear along the stitching provided to attach its internal tethers. The tethers are arranged such that the longitudinal dimension of the tethers lies across the radial lines emanating from the inflator rather than parallel thereto. An improved tether construction, which aids in controlling the shape of the inflated bag and adds strength thereto, also is provided.

BRIEF DESCRIPTION OF THE DRAWINGS

FIG. 11A and 11B are schematic, front and side views, respectively, of an inflatable bag of the invention in a fully expanded, deflated position prior to beginning folding of the bag;

DETAILED DESCRIPTION

Figure 1:
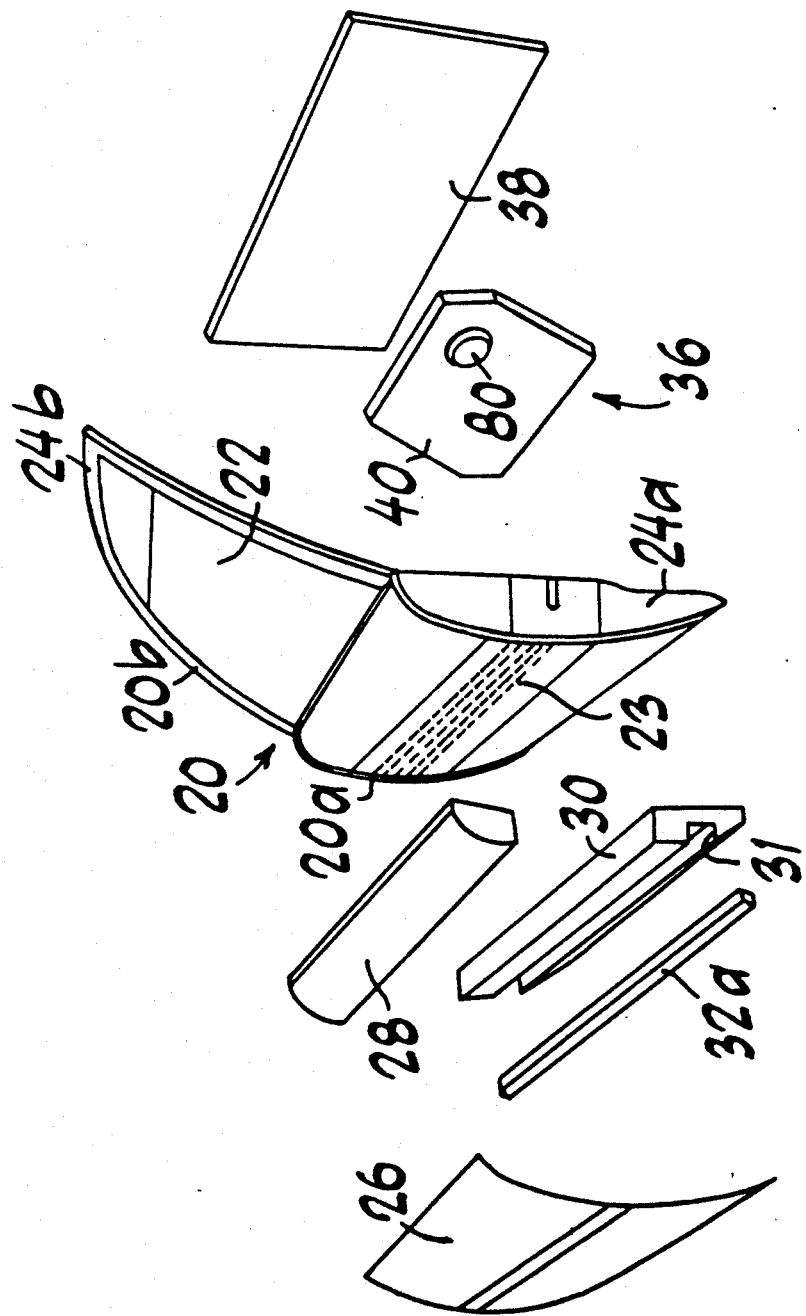
FIG. 1 is an exploded, pictorial representation of a side door of a vehicle containing an inflatable restraint system constructed according to the principles of the invention.

As shown in FIG. 1, the inflatable restraint system of the invention includes an air bag assembly 36 that may be mounted on the side panel 20 of a conventional automobile. The side panel 20, as illustrated, is a side door of the automobile and will be referred to hereinafter as a door panel. It should be recognized, however, that the invention is applicable to a side panel of an automotive vehicle generally and is not restricted to a door panel or to any particular type vehicle. For instance, the invention could be applied to the side panels adjacent to the back seat of a conventional two door automobile, as well as door and side panels of trucks.

In the illustrated embodiment, the door panel 20 includes a lower section 20a and a upper section 20b. The lower section 20a comprises the main body portion 24a of the door panel and has a corrugated door beam 23, represented by dashed lines and shown better in FIGS. 7-8, welded thereto. The upper section 20b includes a window 22 and appropriate window frame 24b. A suitable window operating mechanism (not shown) may be provided to move the window 2 upwardly or downwardly within the frame 24b. A roof pillar is located adjacent to a vertical side of the window 22, and a roof rail 25 is positioned adjacent to an upper side of the window 22 as is disclosed in U.S. Pat. No. 4,966,388. A shown in FIG. 16, the inner side of lower door frame 24a faces the thoracic and pelvic regions of an occupant 114 seated on the seat 116 and the inner side of window 22 and window frame 24b faces the head, neck, and shoulder regions of the occupant.

The air bag assembly 36 includes an air bag 70 (see, e.g., FIGS. 4, 7, 9A, and 9B), which communicates with an inflator 80 via an access opening 50 of a mounting plate 40 to which the inflator is connected. Inflator 80 receives signals responsive to an impact sensor, as discussed in more detail subsequently, to generate gas for deploying the air bag within milliseconds after a collision occurs. As is apparent from FIGS. 6 and 17, to protect the head, thorax, and pelvis of an occupant and form a barrier to cover the window 22, the bag should be dimensioned large enough to buffer intrusion into both the head and thoracic cavity and to impede lateral and oblique movement of the occupant toward the door during impact. The mean width of the bag should be chosen to fill the lateral spacing between the seat 116 and the door panel 20, which varies but is typically 175 mm. As discussed in more detail subsequently and shown in FIG. 9A, the width of the bag is cointrolled by the selection of appropriately sized internal tethers stitched to the opposed sides of the bag, which extend generally parallel to the door panel 20 in the deployed position of the bag.

Figure 7:
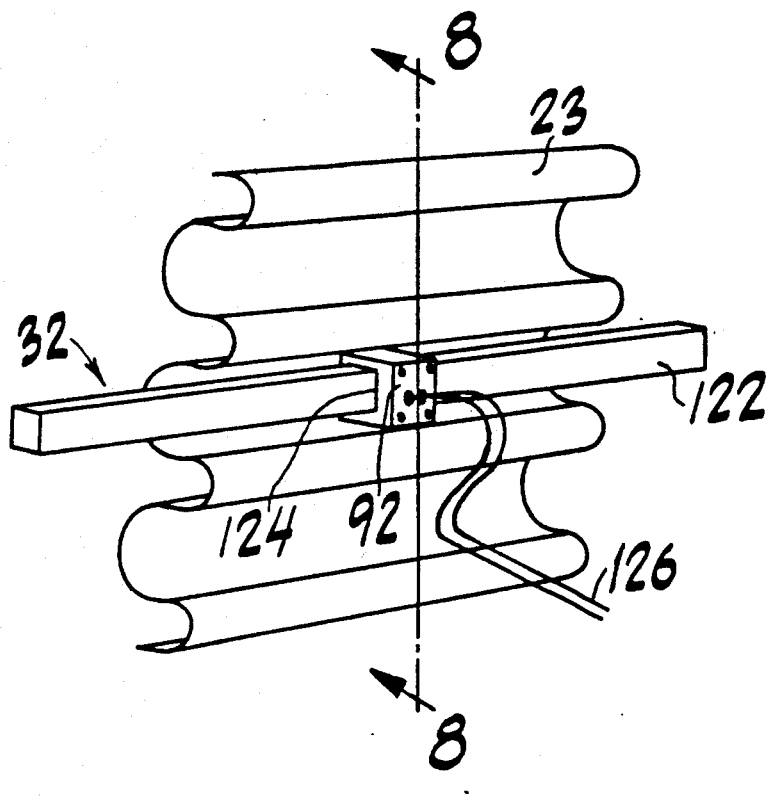
FIG. 7 is a perspective view of a beam switch used to sense side impacts and trigger deployment of the inflatable bag of the invention.
Figure 8:
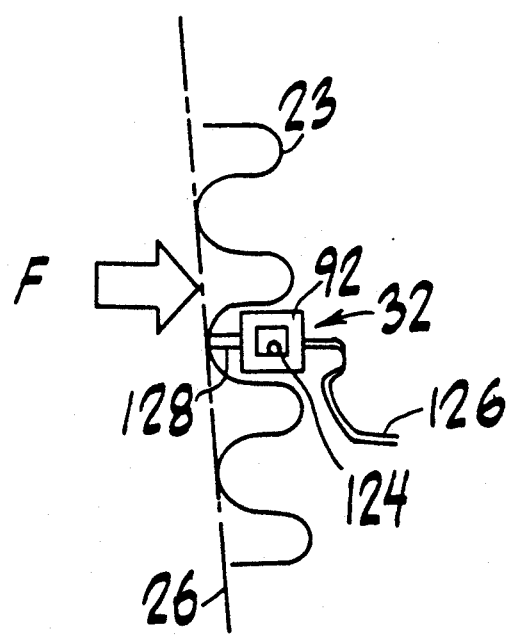
FIG. 8 is a schematic, cross sectional view of the beam switch taken along the line 8—8 of the FIG. 7.

The air bag 70 and inflator 80 are connected to mounting plate 40, which may be formed from aluminum, fixedly attached to the side door 20 by screws or other suitable fasteners. As shown in FIGS. 7-8, door beam 23 supports deflection-triggered beam switch 32, which acts as a sensor for activating the door bag inflator in response to impact against the outer door panel 26. A second, optional deflection-triggered beam switch 32a may be provided in a position in door frame 24a below switch 32 to sense lower impacts. Beam switch 32a may be supported within a groove 31 formed in a lower panel 30, which is located within the door frame 24a, below the corrugated beam 33 to fill the voids between the outer door skin 26 and an inner door panel (to shown). Upper panel 28 is provided in a similar position within door frame 24a above the corrugated beam 23. As noted in U.S. Pat. No. 4,966,388, these panels are placed in the load path of the side impact and preferably are formed of a foamed polymeric material to fill the voids in the door panel 20, thereby providing additional cushioning and enhancing the promptness of occupant-load applications. Load path panels 28 and 30 may be cut so as to neatly fit within the voids in the side door. In a production vehicle, these panels can be molded to fit the openings.

The inner side of the air bag assembly 36 faces a cushioning panel 38, which for purposes discussed subsequently, is detachable connected at appropriate points to the side door 20 by a suitable fastening means. The inner (driver's side) surface of the cushioning panel 38 may be provided with a decorated surface forming the finished inboard side of door panel 20 or may support a separate finished layer. In either case, the outline dimension of panel 38 corresponds roughly to the inner door panel (not shown) and may have angled cuts or openings to provide for a proper fit and access to the window and door operating mechanisms, etc. The cushioning panel 30 is preferably made of a foamed polymeric material such as polyethylene having a thickness of 25 mm and crush resistance of 20 psi. Of course, the thickness of the panel 30 will vary depending upon the lateral spacing between the seat and door panel of the particular vehicle, as well as ergonomic design considerations.

Figure 6:
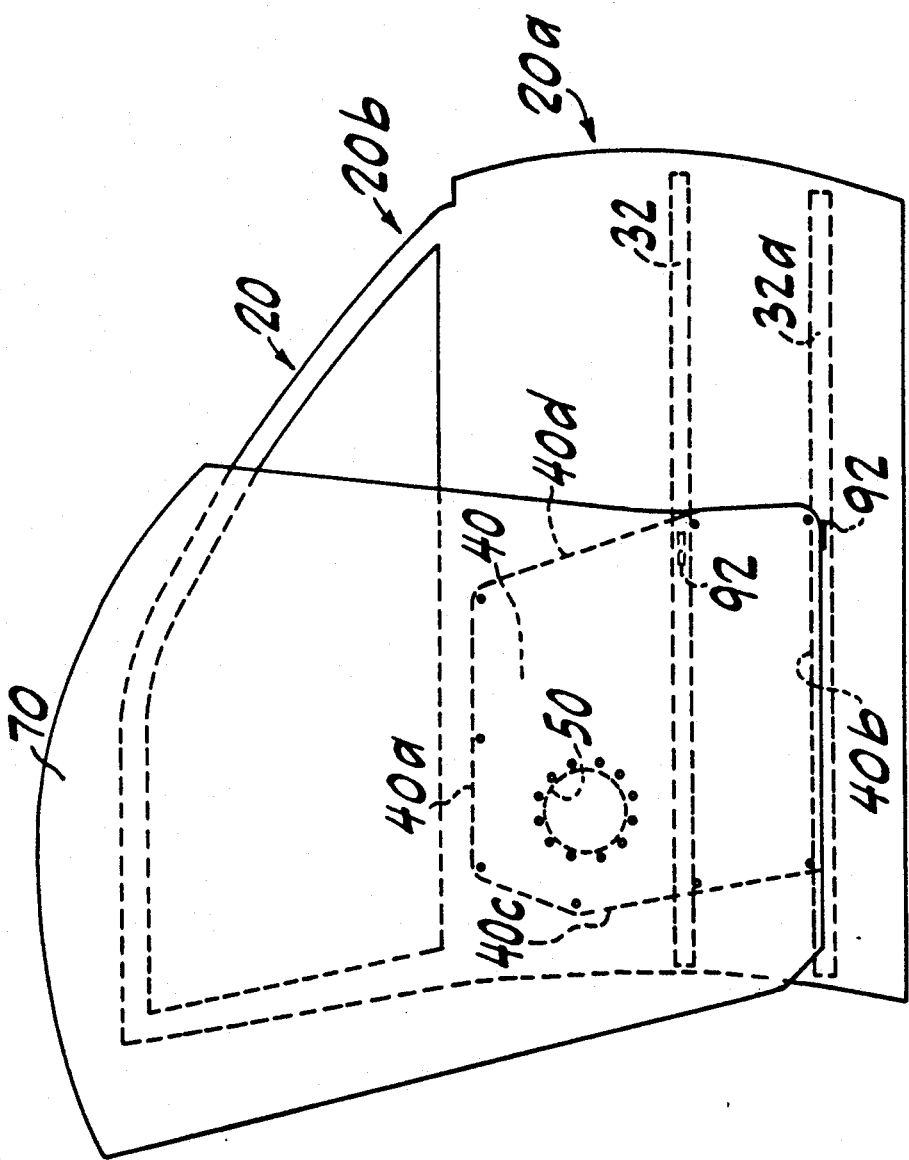
FIG. 6 is a front view (driver's side perspective) of the inflatable bag of the invention in a fully expanded position.
Figure 17:
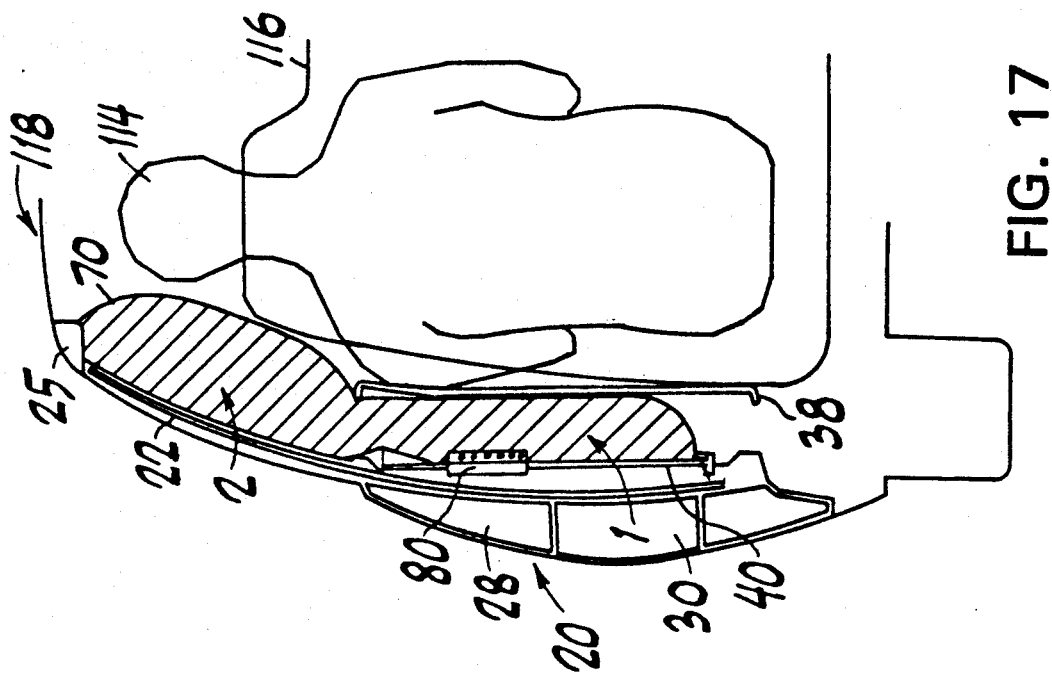
FIG. 17 is a schematic view similar to FIG. 16 showing the inflatable bag of the invention in it fully deployed position.

The mounting plate 40 is illustrated in more detail in FIGS. 2A, 2B, 3, 4, and 6 and is much larger than the backup plate employed in the '388 patent. As shown in FIGS. 6 and 17, plate 40 covers most of the rear half of the door panel 20. The upper edge 40a of the plate is adjacent the bottom of the window 22. The plate 40 extends downwardly to a bottom edge 40b, which is close to the bottom of lower door section 20a. The rear side edge 40c of plate 40 is adjacent the rearmost portion of door section 20a while the plate extends horizontally to a front side edge 40d adjacent the middle of door section 20a. Around the perimeter of the mounting plate 40, a plurality of holes 42 are formed and the mounting plate 40 is fixed to the side door 20 by screws, bolts, or other suitable fasteners. Three sets of holes 46 are formed inwardly of holes 42 to attach the air bag 70 to the mounting plate 40 via bolts 56, nuts 58, and fastener strip reinforcements 98 shown in FIG. 9A. Two sets of holes adjacent the edges 40c, 40d of the plate 40 is positioned at approximately the same vertical level as inflator opening 50 but rearwardly spaced therefrom.

The strip reinforcements 98 may be formed from the same material as air bag 70, typically nylon, teflon or other suitable material. The reinforcements 98 are sandwiched against the inside of the air bag 70 by the bolts 56 and nuts 58 connecting the bag 70 to the mounting plate 40. Alternatively, the reinforcements 98 may be stitched to the inner surface of the bag material before it is stitched into bag 70. As shown in FIG. 9, one reinforcement 98 is provided for each set of holes 46. The reinforcements 98 distribute the load imposed on the bag during deployment to reduce the tendency of the air bag 70 to tear at holes 46.

Figure 3:
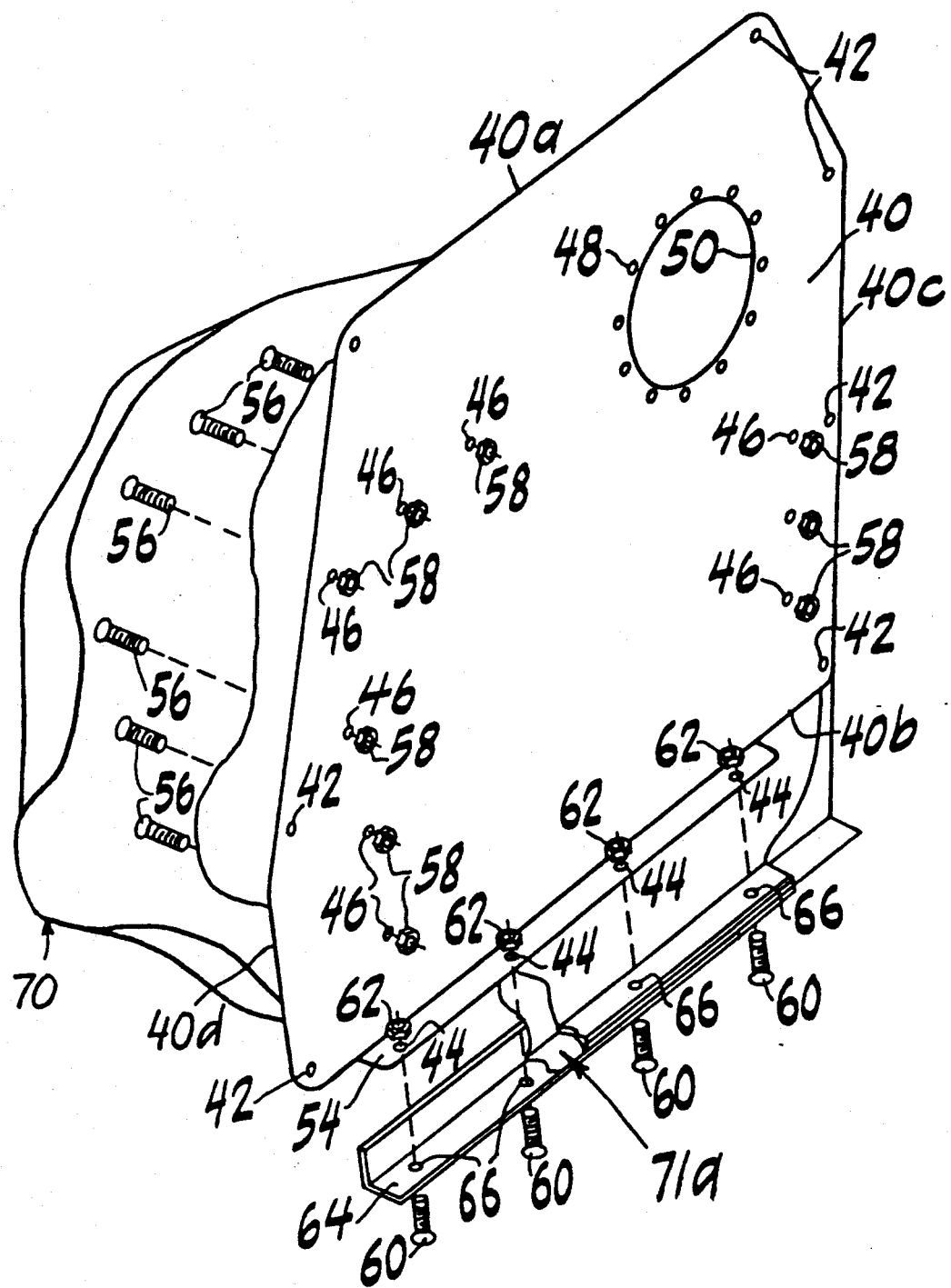
FIG. 3 is an exploded, perspective view showing the points of attachment between the inflatable bag and mounting plate of the invention.

As shown in FIG. 3, the mounting plate 40 has an circular opening 50 to which the inflator 80 is fixed and through which the bag 70 is inflated. A plurality of holes 48 disposed around the opening 50 are used to attach the inflator 80 by a suitable connection discussed with the description of FIG. 4. At the lower edge of the mounting plate 40, a lip portion 54 is bent at an angle of approximately 90 degrees to the generally flat planar surface of the plate 40. A lower portion of the air bag 70, such as bottom edge 71a or stitched portion 94a (see FIG. 9A), is firmly held lip portion 54 and an angle clamp 64, which may also be formed from aluminum. The lip portion 54 and the angle clamp 64 have holes 44 and 66, respectively, through which bolts 60 extend for holding the air bag in place. The lower edge 71a of the air bag 70 shown in FIG. 3 is clamped tightly between the lip portion 54 of the mounting plate 40 and the angle clamp 64 by nuts 62 and bolts 60. Use of angle clamp 64 obviates the need for a strip reinforcement at this connection. The connections of the air bag 70 to the bottom and sides of the mounting plate restrain the bag during inflation to ensure that the lower portion thereof is directed laterally toward the occupant to protect the pelvis and waist region. Also, as discussed subsequently in connection with FIG. 4, the outer layer of the deployment envelope 76 is retained between lip 54 and clamp 64.

Figures 2A, 2B:
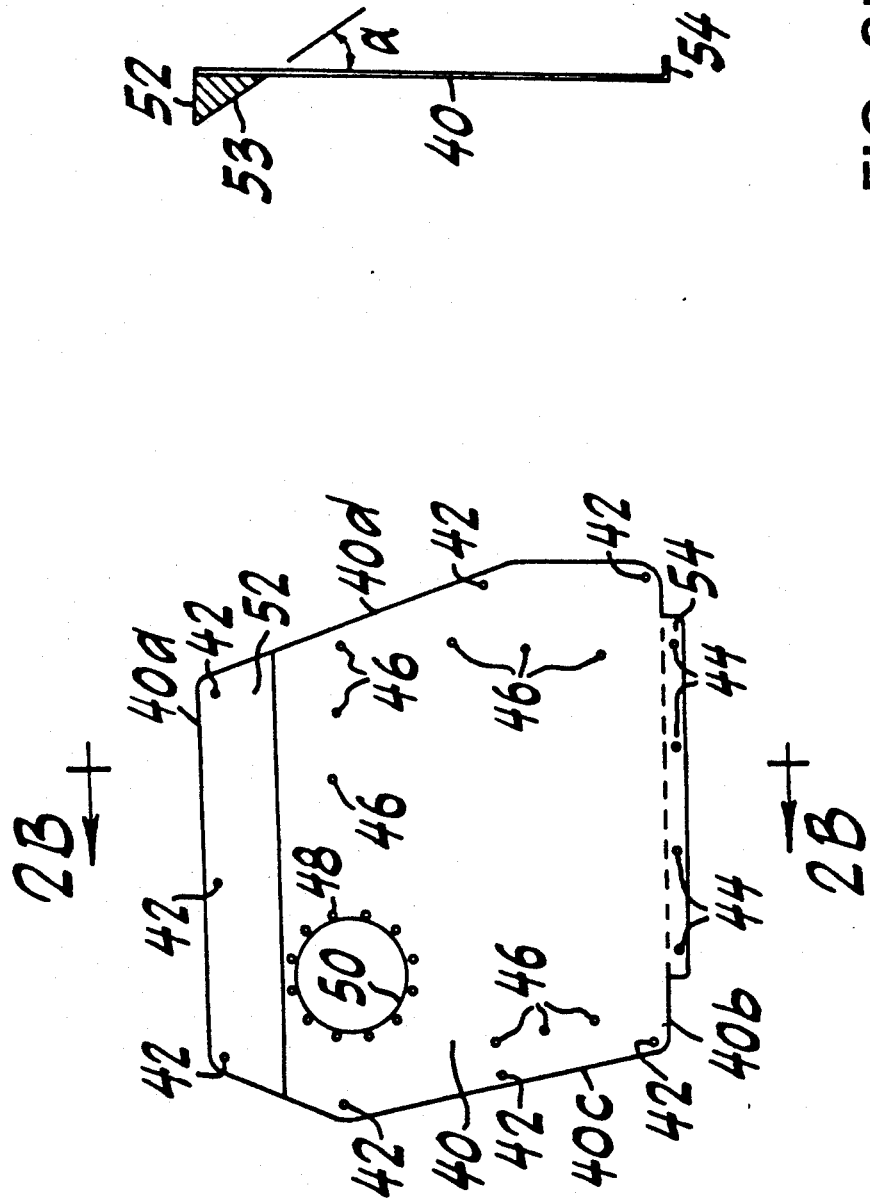
FIG. 2A is a plan view of a mounting plate to which the inflatable bag of the restraint system illustrated in FIG. 1 is attached.
FIG. 2B is a schematic, cross sectional view of the mounting plate taken along the line 2B—2B of FIG. 2A.
Figure 4:
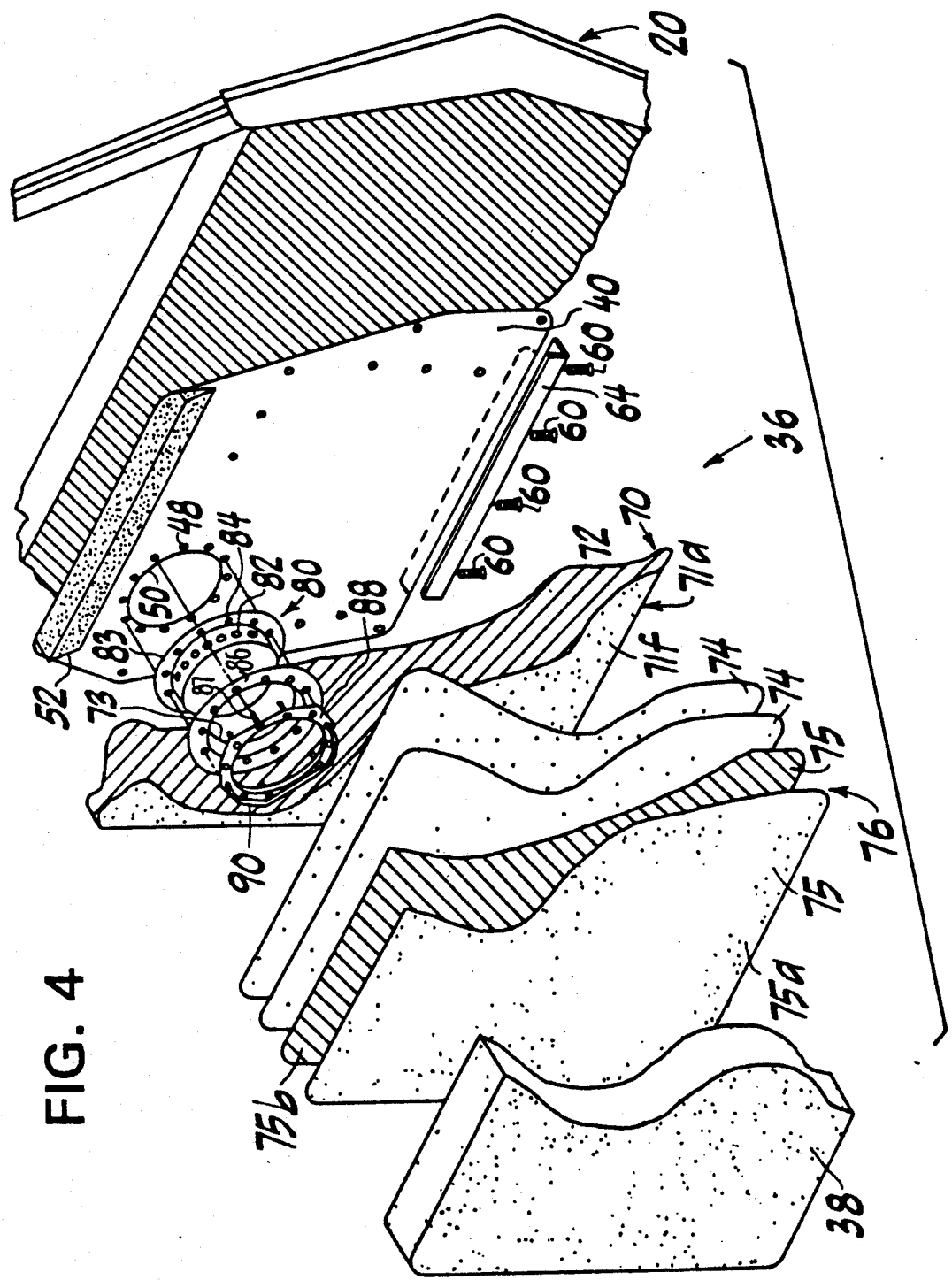
FIG. 4 is an exploded, partially cut away showing the placement of the deployment envelope of the invention between the inflatable bag and cushioning panel.

As shown in FIGS. 2A, 2B and 4, an inclined ramp pad 52 is installed at the top edge 40a of the mounting plate 40. The ramp pad 52 has a guide surface 53 inclined toward the inside of the vehicle compartment, i.e., toward the occupant as illustrated in FIG. 3, so as to guide the deployment of the air bag 70 in a direction toward the occupant and away from the window 22. As shown in FIG. 2B, the guide surface 53 is inclined at an angle of preferably 35–40 degrees relative to the mounting plate 40. The guide pad 52 may be made of a polyethylene foamed material and glued or otherwise secured tightly to the mounting plate 40. To decrease the friction between the guide surface 53 and the air bag 70, the guide surface 53 may have a low friction tape applied thereto or otherwise be formed with a low friction surface. The guide pad 52 directs the deployment of the air bag 70 toward to the occupant so the air bag 70 reaches its fully deployed position adjacent the occupant in a shorter time period than if the pad were not used. Pad 52 also reduces the possibility of the air bag being deployed through the window or window opening if the window is open.

FIG. 4 illustrates the deployment envelope 76 of the air bag assembly 36, which is disposed between the cushioning panel 38, located at the innermost side of side door 20, and the mounting plate 40. The deployment envelope 76 keeps the air bag 70 in its folded, stowed position behind panel 38 and facilitates rapid, smooth deployment of the bag from this position.

Deployment envelope 76 comprises two sheets 75 of bearing material and two sheets 74 of friction reducing material. Sheets 75 may be formed of rubberized nylon, such as the same material from which the air bag is made. Thus, each bearing sheet 75 has a nylon surface 75a and a rubberized surface 75b. The two sheets of friction reducing material may be formed from butcher paper or other material such as teflon (polytetrafluoroethylene). Sheets 74 and 75 have approximately the same surface area as that of the mounting plate 40. The innermost bearing sheet 75 (adjacent panel 38) is clamped together with the bottom of the bag 70 between lip portion 54 and angled clamp 64, as illustrated in FIG. 3. The outer bearing sheet 75 may be fastened vertically to the front edge 40d of the mounting plate. The rubber sides of the bearing sheets 75 face each other. In this manner, a measure of restraint is provided against forward deployment of the bag as the two layers 75 abut each other with their common rubberized surfaces 75b. Other arrangements besides the illustrated dual rubberized nylon sheets are contemplated, such as the use of one sheet of bearing material, and will suffice as along as a sufficient measure of restraint against forward deployment of the bag is provided.

The two sheets of butcher paper 74 are sandwiched between the outermost bearing layer 75 and the front side 71f and of bag 70. For optimum friction reducing properties, the paper to paper interface between sheets 74 may be dusted with talc powder, corn starch, or other suitable material, to minimize the friction therebetween and provide the smoothest possible deployment. In this manner, the shear stresses that arose in the prior system from the direct contact of the nylon outer surface of the bag and the interior cushioning panel are minimized. The deployment envelope enhances the smooth deployment of the air bag to minimize the risk that the bag will not reach its fully deployed position quickly enough.

Figure 5A:
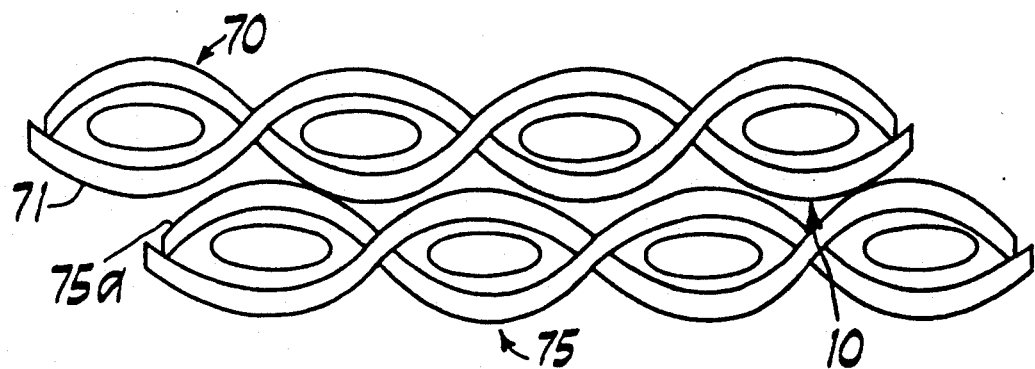
FIG. 5A–5C are enlarged, schematic cross sectional views illustrating the use of friction reducing sheets of material in the interface between the inflatable bag and the bearing sheets of the invention.
Figure 5B:
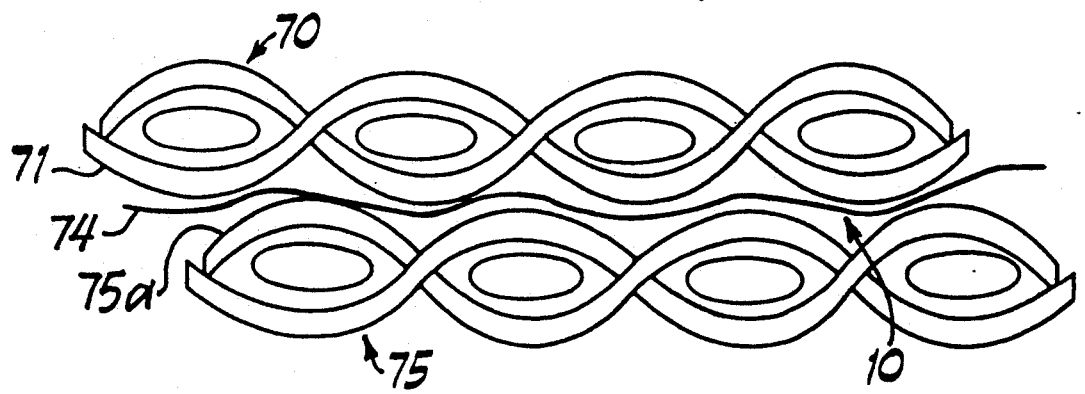
Figure 5C:
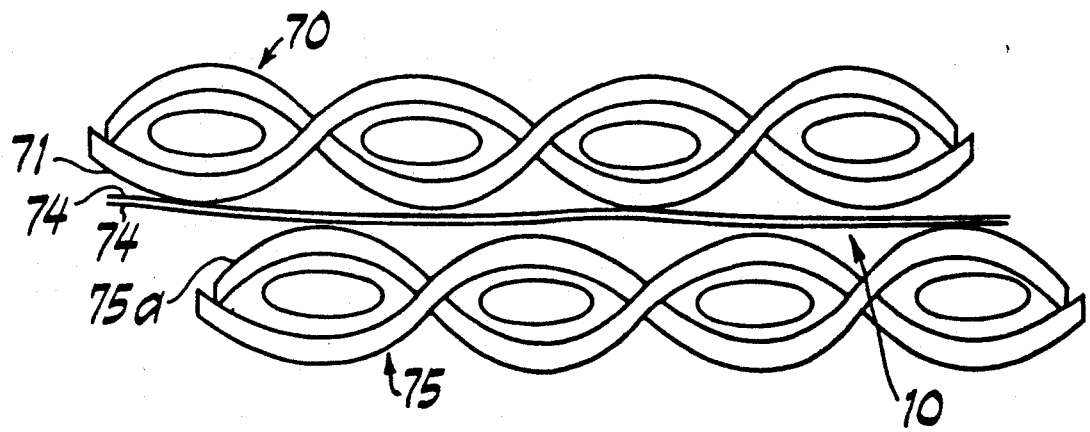

FIGS. 5A, 5B, and 5C show on a greatly enlarged scale how the butcher paper works between two surfaces of nylon material, such as the outer surface 71f of the air bag 70 and the surface 75a of outer bearing sheet 75. In FIG. 5A, butcher paper is not employed between the nylon surfaces 71, 75a. The friction between the two surfaces 71, 75a is large due to the nesting or entanglement of the surfaces in the interstices of the sheets. FIG. 5B shows how one sheet of butcher paper 74 placed between two surfaces reduces friction by hampering the nesting effect. FIG. 5C shows how use of a pair of butcher papers 74 placed between the two surfaces even further reduces friction by practically eliminating the nesting altogether.

FIG. 4 also illustrates how the air bag 70, which may be made from 0.840 denier nylon fabric material coated on one side 72 (inside) with a black neoprene rubber, is attached to the circular opening 50 in mounting plate 40. A circular opening in the air bag 74 is reinforced by stitching an annular reinforcing member 86 of double thickness bag material to the opening 50. The annular member 86 includes holes 73 which are aligned with the holes 48 in the mounting plate. The inflator 80 has an annular flange 83 with a plurality of holes 84 that may be aligned with the holes 48 and the holes 73. A retaining ring 88 includes a plurality of bolts 87, which are received in holes 73 of annular member 86, holes 84 of the inflator 80, and holes 48 in the plate 40, to connect the bag, inflator, and plate together via bolts (not shown). A pressure sensor 90 may be mounted to the retaining ring 88 for monitoring the pressure in the bag 70, but probably need not be employed in a production vehicle.

The inflator 80 is located near the top and at rear portion of the side door 20. The inflator communicates with the air bag 70 through opening 50 and exhaust ports 82, which conduct gas generated by the inflator to the inside of the air bag 70. The inflator 80 is preferably a pyrotechnic inflator commercially available for use in inflating air bags in the automobile industry, such as those distributed by Morton international. Instead of using bag material as an annular reinforcing member 86, a plastic reinforcement ring may be stitched to the air bag 70. In either case, reinforcing member 86 aids in preventing tears from occurring in the air bag around the holes 73, which also may be reinforced with stitching. The holes 73 may be formed in the bag material itself or in member 86.

FIGS. 6 and 17 illustrate the extent of the air bag 70 to both the upper section 20b of the door panel for protecting the head of the occupant and to the bottom section 20a of the door panel for protecting the pelvis and waist region of the occupant. The planar sides of the bag extend in a direction parallel to the door panel 20 to cover most of the window 22. FIG. 6 also shows the locations of the beam switch 32 and the optional beam switch 32a, which are employed to detect side impacts exerted against the upper and lower portions of the outer door panel 26, respectively.

The details of the beam switch 32 are illustrated in FIG. 7 and 8. The construction of switch 32a is identical to switch 32 except for its mounting within a groove 31 in panel 30 rather than in corrugated door beam 23 as is the case with switch 92. In the corrugated portion of the beam 23, a support beam 122, which may comprises a square steel tube, is supported at the ends of the door beam 23 between the forward and rearward portion of the door frame 24a. (See FIG. 1) The beam 23 extends through a central opening forward in a microswitch 92 to support same. The switch 92 includes an outwardly biased push rod 128, which abuts the inner surface of the corrugated door beam 23. The switch 92 has an OFF position in the extended position of the push rod 128 and an ON position when the rod 128 is deflected by a predetermined amount, typically 2-5 mm. If the outer door skin 26 receives an outer force or impact F, its deflection is correspondingly transmitted to the door beam 23, which pushes the rod 128 to turn the switch 124 ON if the deflection is equal or greater than the predetermined amount. In a conventional manner, wires 126 send a signal to electrically activate the inflator 80, which generates the gas pressure used to inflate the bag.

Figure 9B:
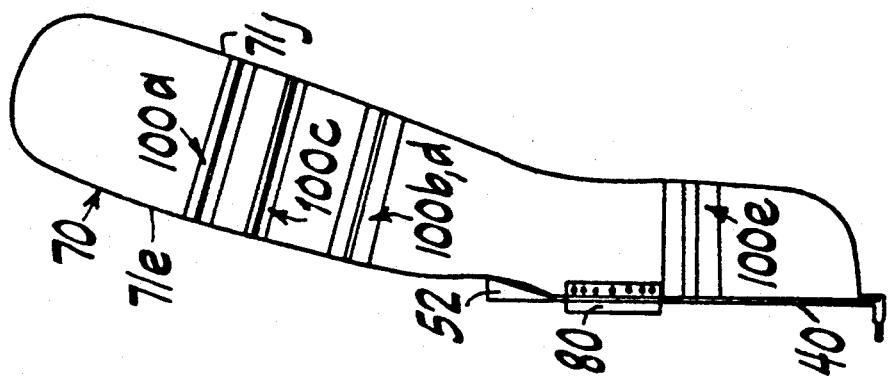
FIG. 9B is a side view (left rear passenger's perspective) of the inflatable bag shown in FIG. 9A in which the location of the internal tethers are shown.
Figure 9A:
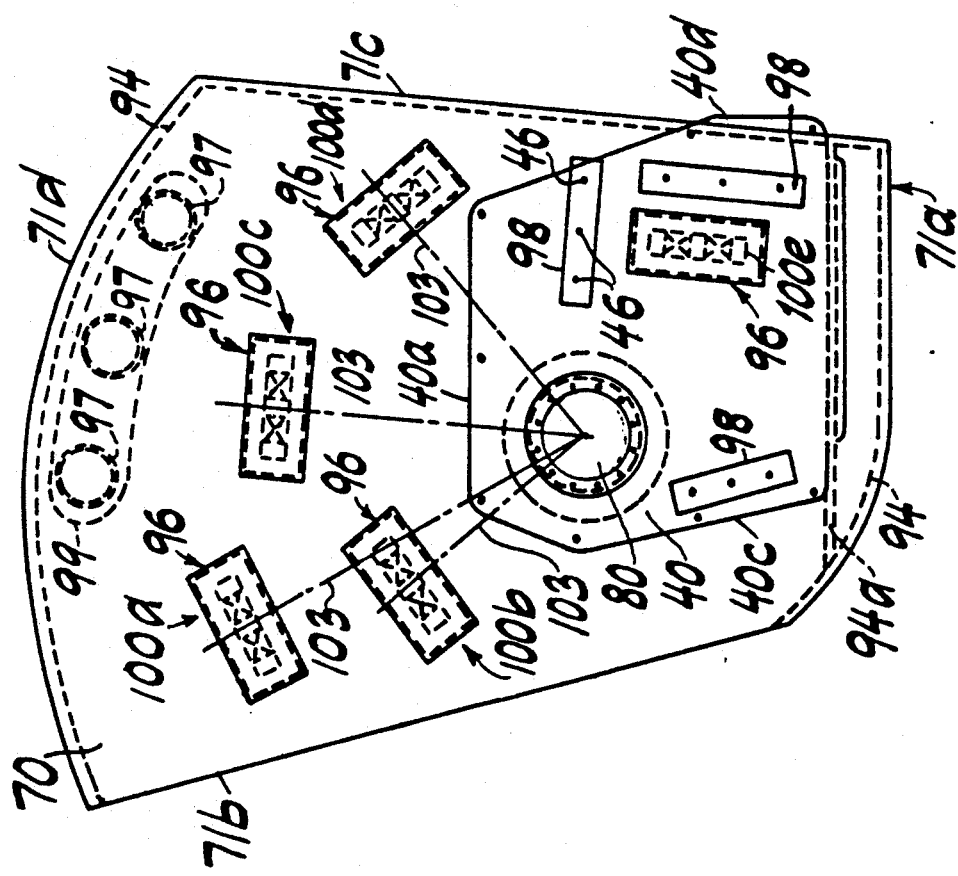
FIG. 9A is a front view (driver's side perspective) of an expanded inflatable bag of the invention showing the location of internal tethers and reinforcing attachment members.

As is apparent from FIG. 9A, the air bag 70 is made from a single sheet of material, preferably 0.840 denier nylon fabric coated on one side with black neoprene. The sheet is folded about its center line, which forms one side edge 71b of the bag, such that the rubber surface is on the bag interior. The bottom edge 71a, top edge 71d, and other side edge 71c are stitched together, preferably with a chain stitch, to form the inflatable bag. A second line of stitching may be made at 94a to restrain the bottom of the bag and the bag may be attached to the bottom edge of the plate 40 at this point rather than at the bottom edge 71a as shown in FIG. 3.

FIGS. 9A and 9B schematically illustrate the location of a plurality of tethers 96 and reinforcements 98 in solid lines to avoid confusion with the bag stitching, which is shown in dashed lines. Tethers 96 are preferably made from light-gauge nylon belt webbing, which are stitched inside the air bag 70 to control the shape of the air bag 70 when it is deployed and add to its strength. More specifically, tethers 96 restrain the width of the air bag 70 from deploying beyond a certain distance in the lateral direction of the vehicle body. The tethers connect the opposed, broad planar sides 71e, 71f of the air bag to each other.

Figure 10:
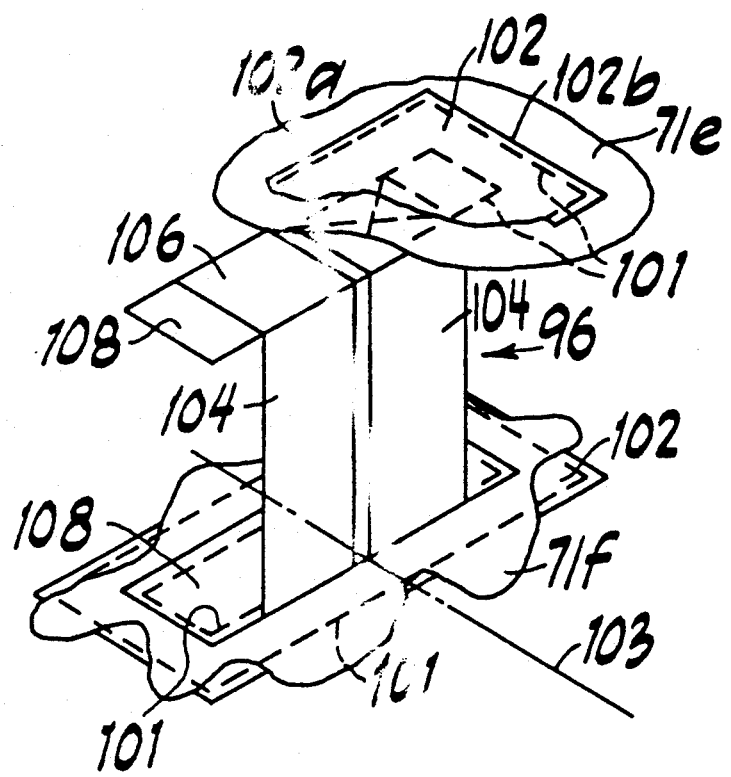
FIG. 10 is an enlarged, perspective view of internal tethers used to connect opposed sides of the inflatable bag of the invention.

The construction of the tethers are illustrated in FIG. 10. Each tether 96 comprises two straps of nylon belt webbing 104, two backs 108, and tow anchors 102 reinforcing the sides 71e, 71f of the bag 70. Each tether back is simply another strip of belt webbing to which the folded ends 106 of straps 104 are stitched. After the tether straps 104 are sewn to the tether backs 106, the ensuing tether assembly is then sewn to the opposed sides 71e, 71f of the bag, which have been reinforced with tether anchors 102. Each tether anchor comprises a layer of air bag or other suitable reinforcing material that has been stitched to the air bag. All of the tether stitching may be lock stitches for added strength and a single tether strap may be used instead of dual straps 104.

The approximate location of the tethers 96 are shown in FIGS. 9A and 9B at 100a, 100b, 100c, 100d and 100e. Each tether anchor has two long sides 102a and two shorts sides 102b, which define a rectangular shape. The tethers are oriented such that the longer dimension of tether anchors parallel to side 102a lies across radial lines 103 emanating from the center of the inflator 80. This orientation minimizes the effects of the stress caused by the thrust, which emanates spherically from the inflator upon deployment of the air bag, and reduces the tendency of the bag and/or tethers to tear when compared to the orientation of the tethers parallel to the radial lines, as shown in the '388 patent. Tethers 100a-100d preferably are oriented such that the longer dimension of each tether anchor is arranged at 90° angle to its respective radial line. Tether 100e need not be oriented perpendicular to its radial line 103 because the bag is reinforced in this region by the connection of the bag and reinforcement 98 to the plate 40. Thus, tether 100e, although it could be perpendicularly oriented like the other tethers, is arranged parallel to the lower rightmost (forward) reinforcement 98.

FIG. 9A also illustrates the provision of a certain number of vent holes 97, which in a manner known in the art permit controlled venting of the gas in the deployed air bag 70. The bag is stitched at 99 around the vent holes 97 to reinforce the periphery of the holes 97.

The improved air bag folding technique of the invention is shown in FIGS. 11 through 14. The folded portions of the bag are shown in dashed lines in these figures. For purposes of clarity of illustration of this technique, the mounting plate and the parts attached thereto are shown in solid lines.

Figure 12B:
FIGS. 12A and 12B are schematic, front and side views, respectively, of the inflatable bag of FIGS. 11A and 11B illustrating the side folding step of the invention.
Figure 12A:
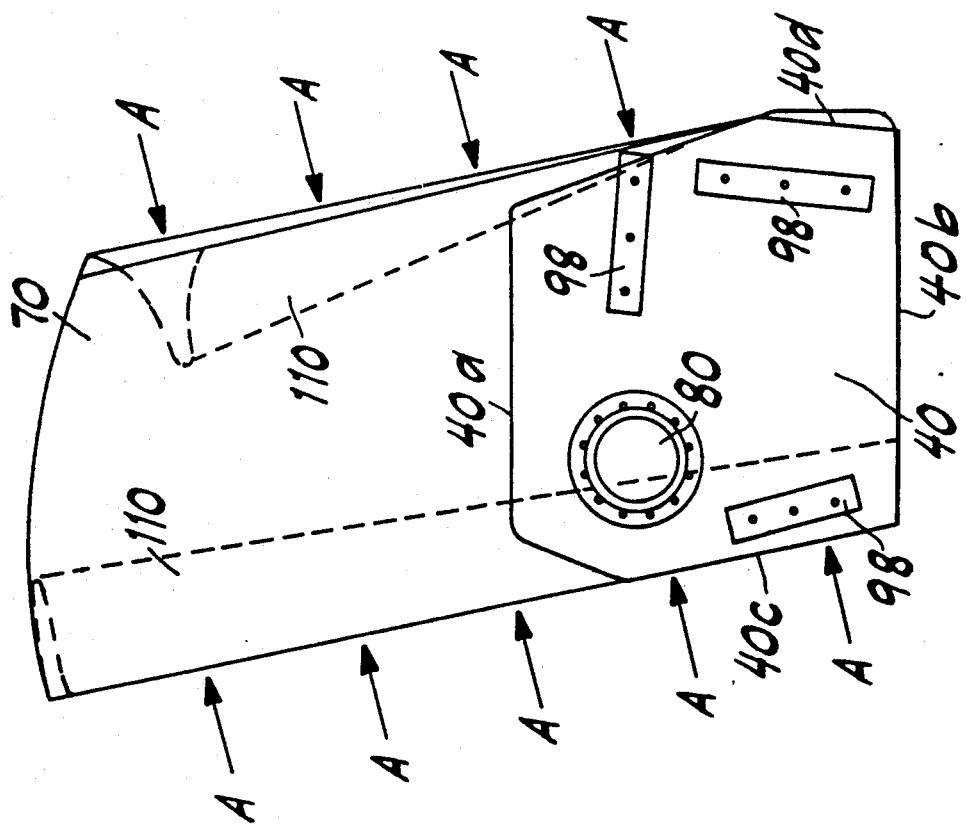
Figure 13B:
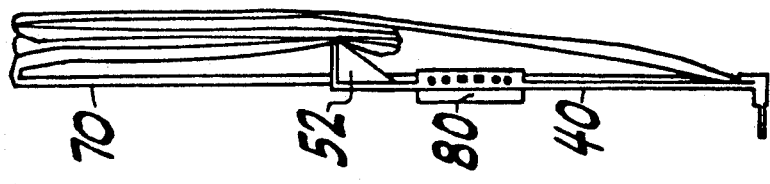
FIGS. 13A and 13B are schematic, front and side views, respectively, of the inflatable bag of FIGS. 12A and 12B illustrating the first top folding step of the invention.
Figure 13A:
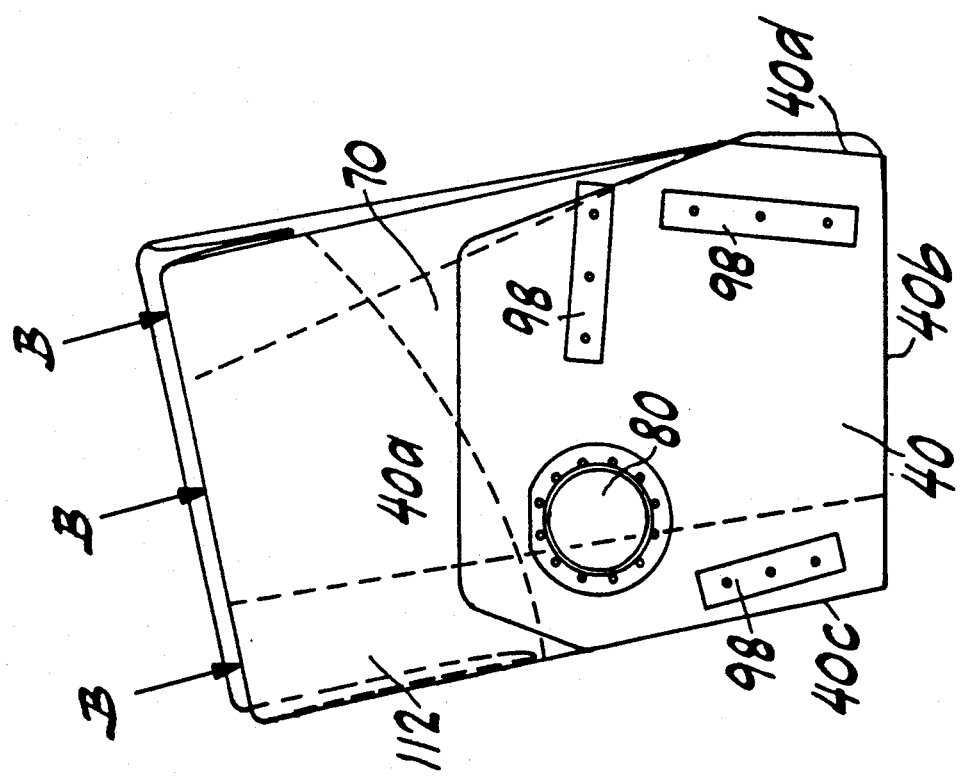
Figure 14B:
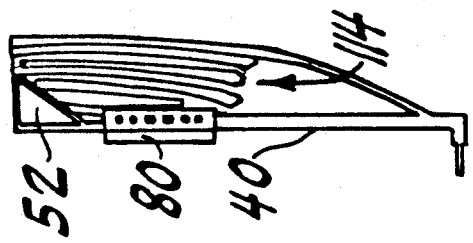
FIGS. 14A and 14B are schematic, front and side views, respectively, of the inflatable bag of FIGS. 13A and 13B illustrating the second top folding step of the invention.
Figure 14A:
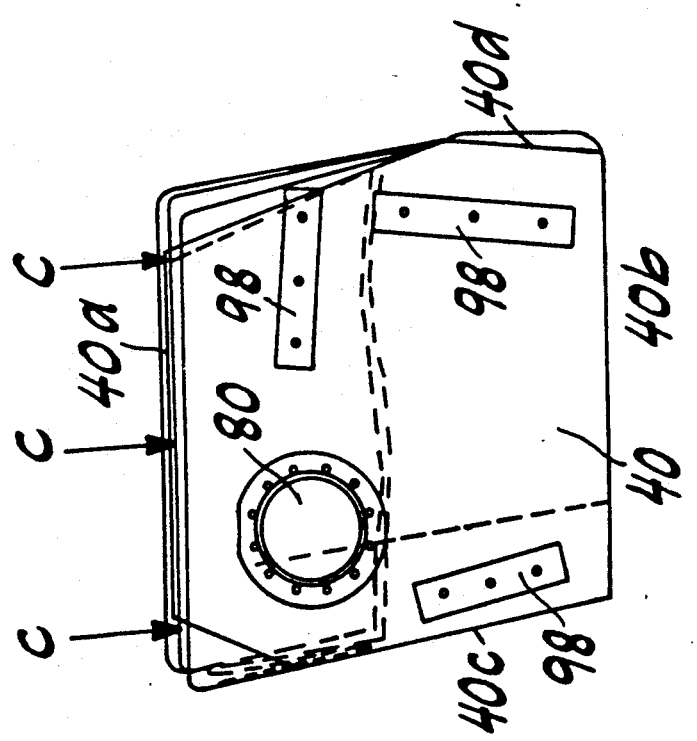
Figure 15A:
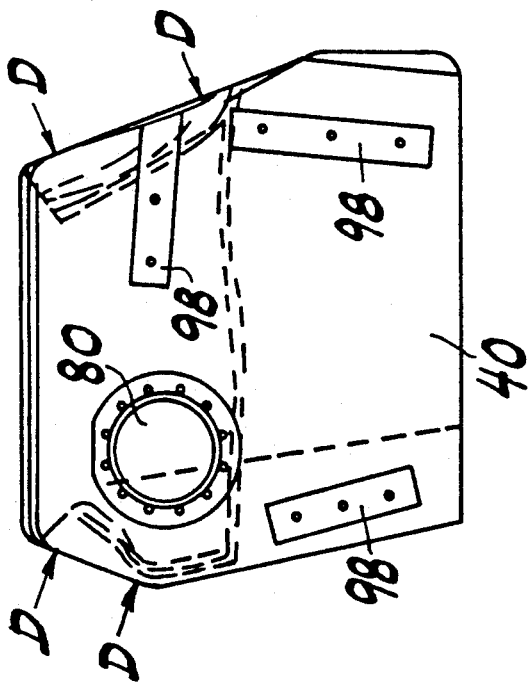
FIGS. 15A and 15B are schematic, front and side views, respectively, of the inflatable bag of FIGS. 14A and 14B illustrating the last folding step of the invention.
Figure 15B:
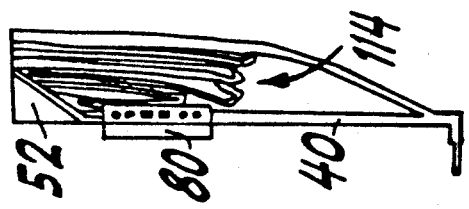

FIGS. 11A-11B illustrate the air bag 70 in a fully deflated, but expanded position prior to beginning folding of the bag. The internal tethers are in place and the bag is first attached to the mounting plate, as is the inner bearing sheet 75 (not shown in FIGS. 11A-11B). In the first folding step, as shown in FIGS. 12A-12B, both of sides of the air bag 70 are tucked horizontally inward in a first direction generally parallel to edges 40a, 40b, as shown by the direction of arrows A, to create horizontal fold 110. The horizontal dimension of the bag now is generally within the horizontal width or envelope of the plate 40. Next, as shown in FIGS. 13A-13B, the upper portion of the air bag 70 is tucked vertically downwardly in a second direction generally parallel to edges 40c, 40d and perpendicular to the first direction, as shown by the direction of arrows B, to create a vertical, accordion-like fold 112. Then, as shown in FIGS. 14A-14B, the previously folded top portion 112 is tucked again vertically downwardly in the second direction (C) to bring the vertical dimension of bag 70 within the envelope of the mounting plate 40 and create accordion-like pleats 114, which only extend vertically down over the plate to about the middle of the plate. Finally, as shown in FIGS. 15A-15B, the upper ends of pleats 14 are tucked horizontally inwardly in the first direction (D) such that the entire bag is substantially within the envelope of plate 40. The remaining layers of the deployment envelope 76 (not shown in FIGS. 11-15) are placed into position and the cushioning panel 38 attached to keep the folded bag in its stowed position. In the stowed, folded position all of the vertical folds of pleats are formed downwardly from the upper portion of the air bag and there are no upward folds in the lower portion of the air bag. Therefore, the gas pressure generated by the inflator can rapidly expand the bag laterally toward the waist region of the occupant and open the pleats to enable the lateral and upward deployment of the bag to occur substantially simultaneously.

Figure 16:
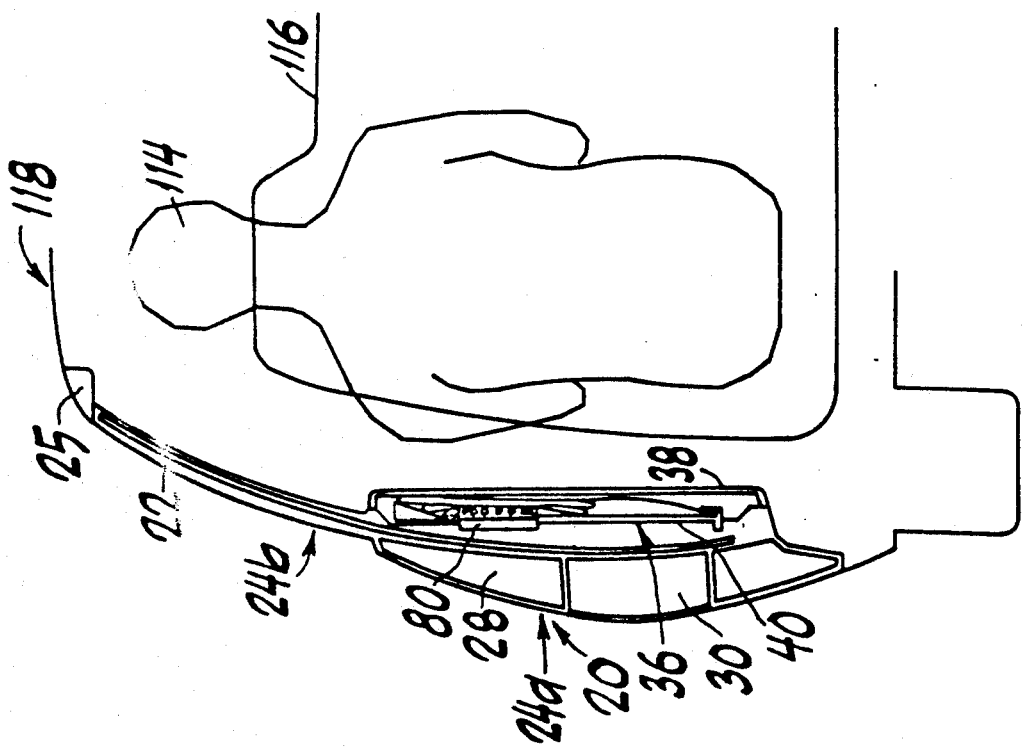
FIG. 16 is a schematic, side view (left rear passenger's perspective) partly in section showing the inflatable bag of the invention in its stowed position.

The operation of the inflatable restraint system of the invention should be apparent from the foregoing, but also is illustrated in FIGS. 16 and 17. FIG. 16 shows the air bag assembly in its stowed condition held in place by cushioning panel 38, which has been detachably connected to the door panel 20, such as by tape or other suitable means. Upon detection of an impact against the side door 20, the impact sensor 32 actuates the inflator 80 to deploy air bag 70. The lower portion 1 of the deploying air bag 70 immediately exerts pressure on the cushioning panel 38 as it expands laterally inwardly and propels the entire cushioning panel 38 toward the occupant to make initial cushioned contact with the occupant's torso and initiate lateral movement away from the door panel. This initial movement minimizes the relative speed at which the door panel makes contact with the occupant during the collision. As there are no folds in this section of bag 70, this lateral movement is particularly rapid and quickly opens up the pleats 114 to enable the bag to fully deploy in the lateral and upward directions substantially simultaneously. Upper portion 2 of bag 70 is directed toward the occupant by the inclined pad and protects the head and thorax of the occupant from contact with the roof rail 25, window 22, and window frame 24. The waist and pelvis of the occupant is protected by lower bag portion 1 from contact with side door section 24a and intrusion by the impacting object.

What is claimed is:

1. In a vehicle having a side panel assembly located adjacent to and laterally spaced from an end of a seat upon which an occupant to be protected is seated, with the side panel assembly including an upper section facing the head and neck of the occupant and a lower section facing the thorax and pelvis of the occupant when the occupant is seated on the seat, an inflatable protective system for cushioning the occupant from an impact of the vehicle by another object, said system comprising:

a mounting plate attached to the lower section of the side panel assembly, said mounting plate having a generally rectangular configuration formed by a bottom edge adjacent the bottom of the side panel assembly, a top edge adjacent the upper section of the side panel assembly, a first side edge adjacent a rear part of the side panel assembly, and a second side edge adjacent a middle part of the side panel assembly;

an inflatable bag foldable into a collapsed, compact configuration and inflatable to form a planar air cushion having dimensions sufficient to extend upwardly over the upper section, downwardly over the lower section, and laterally inwardly across the spacing between the lower section of the side panel assembly and seat, said inflatable bag having a lower portion attached to the mounting plate by a clamping member connecting a bottom edge of the inflatable bag to the bottom edge of the mounting plate, and by a series of attachments including a first set of generally vertical fasteners disposed inwardly from said first side edge, a second set of generally vertical fasteners disposed inwardly from said second side edge, and a third set of generally horizontal fasteners disposed inwardly form said top edge; and an inflator supported within the side of the vehicle and in fluid communication with said inflatable bag, said inflator being responsive to an actuating signal to inflate the bag upon an impact of predetermined force against the side panel assembly whereby the inflatable bag forms a shock absorbing cushion for the head, thorax, and pelvis of the occupant and a cushioning barrier to restrain the occupant's head, thorax, and pelvis from moving into the side panel assembly.

2. The inflatable protective system of claim 1 wherein said inflator is mounted to an opening in the mounting plate, said opening being disposed at approximately the same vertical position as said third set of fasteners and rearwardly spaced therefrom, said inflatable bag being attached to said inflator.

3. The inflatable protective system of claim 2 wherein each set of fasteners includes a series of bolts extending through holes in the mounting plate, nuts securely tightened on the bolts, and a reinforcement member disposed between the bolts and an inside surface of said inflatable bag.

4. The inflatable protective system of claim 1, further comprising a cushioning panel of foamed polymeric material detachably connected to an inner side of the side panel assembly in a position retaining the inflatable bag in its stowed position, whereby upon inflation of the air bag the entire cushioning panel is propelled across the lateral spacing between the side panel assembly and the seat toward the occupant to make initial cushioned contact with the seat and the occupant and to initiate lateral movement of the occupant away from the side panel assembly to minimize the subsequent impact between the occupant and side panel assembly.

5. The inflatable protective system according to claim 1, further comprising a deployment envelope disposed between said inflatable bag and an inner surface member of the vehicle, said deployment envelope including at least one sheet of bearing material and at least one sheet of friction reducing material, said at least one sheet of bearing material attached to a bottom portion of the mounting plate and said at least one sheet of friction reducing material being sandwiched between said at least one sheet of bearing material and said inflatable bag.

6. The inflatable protective system of claim 5 wherein said at least one sheet of bearing material comprises first and second sheets of material, each having a nylon surface and a rubberized surface, said first sheet being attached to the bottom portion of its mounting plate and positioned such that its nylon surface abuts the cushioning panel, said second sheet being positioned such that its rubberized surface abuts the rubberized surface of the first sheet, and said at least one sheet of friction reducing material comprising third and fourth sheets of paper, said third and fourth sheets being sandwiched between the nylon surface of the second sheet and the inflatable bag.

7. The inflatable protective system of claim 6 wherein the side panel assembly has an outer panel and said cushioning panel forms an inner panel of the side panel assembly spaced from said outer panel to form voids therebetween, and further comprising additional foamed polymeric panels filling substantially all otherwise void space between said outer and inner panels to provide additional cushioning and prompt occupant loading during impact of the side panel assembly by another object.

8. The inflatable protective system of claim 1 wherein said inflatable bag includes two generally opposed sides and said upper portion of the inflatable bag is folded into a pouch lying against an inwardly facing surface of the mounting plate, said pouch having horizontal folds created by folding the sides of the bag inwardly and accordion-like pleats created by folding the upper portion of the bag vertically downwardly, said pleats extending partially downwardly over the inwardly facing surface to a middle region thereof and being generally confined with the envelope of the mounting plate.

9. The inflatable protection system of claim 8 wherein when inflated said bag has a first side lying adjacent the inwardly facing surface of the mounting plate and an inner side of the side panel assembly, a second side laterally spaced therefrom to face the interior of the vehicle, and a plurality of tethers connected to and spanning across said first and second sides, each tether being connected to said first and second sides by anchors having a long dimension and a short dimension, each anchor being connected to one of said first and second sides such that its long dimension is arranged at an angle relative to a radial line emanating from the inflator to the respective tether, said tethers limiting lateral expansion of the inflatable bag.

10. The inflatable protection system of claim 9 wherein at least some of the tethers are arranged at an angle perpendicular to its respective radial line.

11. The inflatable protection system of claim 10 wherein at least one of the tethers is arranged in the lower portion of the bag.

12. The inflatable protection system of claim 11 wherein said at least one tether is arranged at a non-perpendicular angle to its respective radial line.

13. The inflatable protection system of claim 9 wherein each tether comprises at least one strap of reinforcing material having first and second ends, and first and second tether backs stitched to the first and second ends of said at least strap.

14. The inflatable protection system of claim 13 wherein the backs of each tether are stitched to one of said anchors, said anchors being stitched to one of the sides of the bag, with all of the stitching between the sides of the bag and the anchors, the anchors and the tether backs, and the tether backs and said at least one strap being lock stitches.

15. In a vehicle having a side panel assembly located adjacent to and laterally spaced from an end of a seat upon which an occupant to be protected is seated, with the side panel assembly including an upper section facing the head and neck of the occupant and a lower section facing the thorax and pelvis of the occupant when the occupant is seated on the seat, an inflatable protective system for cushioning the occupant from an impact of the vehicle by another object, said system comprising:

a mounting plate attached to the lower section of the side panel assembly having a generally rectangular configuration formed by a bottom edge adjacent to the bottom of the side panel assembly, a top edge adjacent to the upper section of the side panel assembly, a first side edge adjacent to a rear part of the side panel assembly, and a second side edge adjacent to a middle part of the side panel assembly, said mounting plate having a substantially planar inner surface facing the interior of the vehicle against which the inflatable bag rests in its stowed position and an inclined pad attached to an upper portion of the mounting plate in a position closely adjacent a bottom portion of the window, said inclined pad including a guide surface disposed at an acute angle relative to the inner surface of the mounting plate whereby upon deployment of inflatable bag the guide surface directs the upper portion of the bag away from the window and toward the occupant, wherein the side panel assembly comprises a side door of the vehicle, said upper section comprises a window and window frame of the side door, and a lower section comprises a main body portion of the side door.

16. The inflatable protective system of claim 5 wherein said guide surface includes a friction reducing material.

17. The inflatable protective system of claim 16 wherein said acute angle is between approximately 35 and 40 degrees.

* * * * *

UNITED STATES PATENT AND TRADEMARK OFFICE
CERTIFICATE OF CORRECTION

PATENT NO. : 5,224,732

DATED : July 6, 1993

INVENTOR(S) : Charles Y. Warner, et al.

It is certified that error appears in the above-identified patent and that said Letters Patent is hereby corrected as shown below:

Column 1, line 22, change "bas" to --bag--.

Column 3, line 16, change "side" to --sides--.

Column 5, line 9, change "it" to --its--.

Column 5, line 26, change "a upper" to --an upper--.

Column 5, line 33, change "2" to --22--.

Column 5, line 37, change "A" to --As--.

Column 6, line 11, change "(to shown)" to --(not shown)--.

Column 6, line 24, change "detachable" to --detachably--.

Column 6, line 45, between "adjacent" and "the" insert --to--.

Column 6, line 50, between "adjacent" and "the" insert --to--.

Column 6, line 58, between "adjacent" and "the" insert --to--.

UNITED STATES PATENT AND TRADEMARK OFFICE
CERTIFICATE OF CORRECTION

PATENT NO. : 5,224,732
DATED : July 6, 1993
INVENTOR(S) : Charles Y. Warner It is certified that error appears in the above-identified patent and that said Letters Patent is hereby corrected as shown below:

Column 6, lines 58 and 59, after "40" on line 58 and before "is" on line 59, insert --are generally vertical, while the third set of generally horizontal holes--.

Column 7, line 5, change "an" to --a--.

Column 7, line 36, change "FIG. 3" to --FIG. 4--.

Column 7, line 48, delete "to".

Column 8, line 19, delete "and".

Column 10, line 56, delete "of".

Column 14, line 8, delete "at least".
Column 14, line 50, change "claim 5" to --claim 15--.

Signed and Sealed this

Thirty-first Day of May, 1994

BRUCE LEHMAN

Attest:

*Attesting Officer*    *Commissioner of Patents and Trademarks*

UNITED STATES PATENT AND TRADEMARK OFFICE
CERTIFICATE OF CORRECTION

PATENT NO. : 5,224,732
DATED : July 6, 1993
INVENTOR(S) : Charles Y. Warner, et al It is certified that error appears in the above-indentified patent and that said Letters Patent is hereby corrected as shown below:

On the title page, after item [76] Inventors: insert the following:

--[73] Assignee: Toyota Jidosha Kabushiki Kaisha--.

Signed and Sealed this

Nineteenth Day of July, 1994

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,224,732
DATED : July 6, 1993
INVENTOR(S) : Charles Y. Warner, et al It is certified that error appears in the above-indentified patent and that said Letters Patent is hereby corrected as shown below:

On the title page, please add: Assignee: Toyota Jidosha Kabushiki Kaisha—.

Signed and Sealed this

Twenty-third Day of August, 1994

*Attest:*

BRUCE LEHMAN

*Attesting Officer*      *Commissioner of Patents and Trademarks*